(12) United States Patent
Nigrelli

(10) Patent No.: US 10,654,726 B2
(45) Date of Patent: May 19, 2020

(54) SOLAR DESALINATOR

(71) Applicant: Sebastian Amella Nigrelli, Brentwood, TN (US)

(72) Inventor: Sebastian Amella Nigrelli, Brentwood, TN (US)

( * ) Notice: Subject to any disclaimer, the term of this patent is extended or adjusted under 35 U.S.C. 154(b) by 0 days.

(21) Appl. No.: 16/410,234

(22) Filed: May 13, 2019

(65) Prior Publication Data

US 2020/0062614 A1 Feb. 27, 2020

Related U.S. Application Data

(60) Provisional application No. 62/722,601, filed on Aug. 24, 2018.

(51) Int. Cl.
*C02F 1/14* (2006.01)
*C02F 1/10* (2006.01)
(Continued)

(52) U.S. Cl.
CPC ............ *C02F 1/14* (2013.01); *B01D 1/22* (2013.01); *C02F 1/10* (2013.01); *C02F 1/5245* (2013.01); *F24S 23/71* (2018.05)

(58) Field of Classification Search
CPC ..... B01D 1/22; C02F 1/10; C02F 1/14; C02F 1/5245; F24S 23/71
See application file for complete search history.

(56) References Cited

U.S. PATENT DOCUMENTS

| 4,003,366 A * | 1/1977 | Lightfoot | F24S 23/70 126/694 |
| 4,069,812 A * | 1/1978 | O'Neill | F24S 20/20 136/246 |

(Continued)

FOREIGN PATENT DOCUMENTS

| CN | 101261096 | 9/2008 |
| CN | 105157464 | 12/2015 |

(Continued)

OTHER PUBLICATIONS

JP2016049480A_ENG (Espacenet machine translation of Takahisa) (Year: 2014).*

(Continued)

*Primary Examiner* — Jonathan Miller
*Assistant Examiner* — Gabriel E Gitman
(74) *Attorney, Agent, or Firm* — Smith Gambrell & Russell LLP

(57) ABSTRACT

A solar desalinator that converts contaminated water to potable water includes a cylindrical solar collector, a trough-shaped parabolic mirror, and a condenser. The solar collector is positioned within the trough-shaped parabolic mirror, and the parabolic mirror focuses the Sun's rays onto the solar collector, heats the water, and converts the water to steam. The steam is fed to the condenser where the steam is condensed to recover potable water. The solar collector includes an inner conduit surrounded by an outer shell with a vacuum in the anger space between. Energy absorbing material in the form of dark metal is positioned in the inner conduit. A residue bulb is attached at the contaminated water inlet to collect residue left by the creation of the steam.

9 Claims, 8 Drawing Sheets

(51) Int. Cl.
*C02F 1/52* (2006.01)
*F24S 23/71* (2018.01)
*B01D 1/22* (2006.01)

(56) References Cited

U.S. PATENT DOCUMENTS

| | | | | |
|---|---|---|---|---|
| 4,281,641 | A | * | 8/1981 | Devore ............ F24S 20/20 126/605 |
| 4,367,727 | A | * | 1/1983 | Llorach ............ F24S 70/20 126/674 |
| 4,595,459 | A | | 6/1986 | Kusakawa et al. |
| 8,246,786 | B2 | | 8/2012 | Cap et al. |
| 8,246,787 | B2 | | 8/2012 | Cap et al. |
| 8,623,180 | B2 | | 1/2014 | Shi et al. |
| 8,882,968 | B1 | | 11/2014 | Griggs |
| 2011/0203915 | A1 | * | 8/2011 | McClure ............ B01D 1/0035 203/3 |
| 2013/0133323 | A1 | * | 5/2013 | Ba-abbad ............ F24S 23/71 60/641.15 |
| 2014/0158516 | A1 | * | 6/2014 | Landrok ............ B01D 1/0035 203/10 |
| 2014/0238837 | A1 | | 8/2014 | Jan et al. |
| 2015/0344325 | A1 | * | 12/2015 | Broeckelmann ......... C02F 1/14 203/86 |
| 2017/0204838 | A1 | * | 7/2017 | Correia ............ F03G 6/065 |

FOREIGN PATENT DOCUMENTS

| | | | | |
|---|---|---|---|---|
| CN | 105157464 | A | * | 12/2015 |
| JP | 201291108 | | | 5/2012 |
| JP | 2016049480 | | | 4/2016 |
| JP | 2016049480 | A | * | 4/2016 ............ B01D 1/02 |

OTHER PUBLICATIONS

CN105157464A_ENG (Espacenet machine translation of Wang) (Year: 2015).*
JP2016049480A_ENG (Espacenet machine translation of Takahisa) (Year: 2016).*
International Search Report and Written Opinion released by the U.S. Receiving Office for corresponding International Patent Application No. PCT/US2019/046098 dated Nov. 5, 2019; 10 pages.

* cited by examiner

SOLAR DESALINATOR

CLAIM OF PRIORITY

This application claims priority from U.S. Provisional Patent Application Ser. No. 62/722,601, filed Aug. 24, 2018, which is incorporated herein in its entirety.

FIELD OF THE INVENTION

This invention relates to a solar desalinator and more particularly to a solar desalinator that employs a parabolic mirror to heat seawater in a tubular solar collector with enhanced heating absorbing properties.

BACKGROUND OF THE INVENTION

Potable water is becoming increasingly scarce worldwide. The global population continues to grow as freshwater reservoirs are already being depleted faster than they can replenish. People in water-sensitive areas have already been using desalination plants to convert sea water into potable water. However, these desalinization methods, namely thermal distillation and reverse osmosis, require large amounts of energy to function, leading to high costs, environmental damage, and unsustainability. Desalinization may be the only reliable source of water in the future as natural water resources continue to disappear, but current methods may be too expensive to supply the world with potable water. There is a need for cleaner, cheaper desalinization apparatus and methods of desalinization or decontamination.

SUMMARY OF THE INVENTION

The solar desalinator of the present invention converts contaminated water, such as seawater, into potable water. The desalinator includes a cylindrical solar collector for receiving and heating the contaminated water and thereby converting the contaminated water to steam. The solar collector is positioned within a trough-shaped parabolic mirror that extends along the length of the cylindrical solar collector and focuses the Sun's rays onto the solar collector. The focal line of the parabolic mirror coincides with the center line of the cylindrical solar collector. A parabolic mirror is the shape that ensures that all of the Sun's rays that are received are focused on the center line of the solar collector. The steam generated in the solar collector is then fed to a condenser where the steam is condensed to recover potable water.

The solar collector comprises a cylindrical inner conduit and a cylindrical outer shell. A vacuum is created in the annular space between the inner conduit and the outer shell. Contaminated water enters the inner conduit through a collector inlet at its lower end, and steam exits the inner conduit through a collector outlet at its upper end.

A disc-shaped silicone stopper is positioned in the inner conduit adjacent the collector outlet. The silicone stopper is capable of blocking water from exiting the inner conduit through the collector outlet but allows steam to pass from the inner conduit through the collector outlet.

Energy absorbing materials are positioned inside of the inner conduit. The energy absorbing materials function as media between the Sun's rays reflected by the parabolic mirror and the contaminated water in the inner conduit. When the Sun's rays hit the energy absorbing materials, the light energy in the Sun's rays is converted to thermal energy in the energy absorbing materials. The energy absorbing materials then transfer the thermal energy to the contaminated water in the inner conduit. The energy absorbing materials can be in the form of metal coils, in the form of a metal mesh, or in the form of a ladder structure. The metal is preferably dark metal, and copper is generally preferred.

In the solar collector of the present invention, the required phase change energy will not take energy from the contaminated water but instead from the thermal energy stored in the mass of the energy absorbing materials. Consequently, the contaminated water does not lose temperature as evaporation occurs unlike in a standard solar evacuated tube. In a sense, the energy absorbing materials act as storage media for the solar collector, storing thermal energy in their mass as they supply heat to the contaminated water while continuing to absorb solar energy. The energy absorbing materials heat the contaminated water from the inside out, leading to a better distribution of heat inside the inner conduit and higher efficiency as a direct result.

As a result of converting the contaminated water to steam in the inner conduit, residue, such as salt or other contaminants, are left behind in the inner conduit. In order to deal with such residue, a residue bulb is attached between a contaminated water inlet and the solar collector inlet. Once the steam process begins in the inner conduit, the residue will sink to the bottom of the inner conduit and into the residue bulb because the residue has a higher density than the surrounding contaminated water. After a predetermined period of operation, the residue bulb can be removed, cleaned, and reinstalled.

Further objects, features and advantages will become apparent upon consideration of the following detailed description of the invention when taken in conjunction with the drawings and the appended claims.

DETAILED DESCRIPTION OF THE PREFERRED EMBODIMENT

Figure 1:
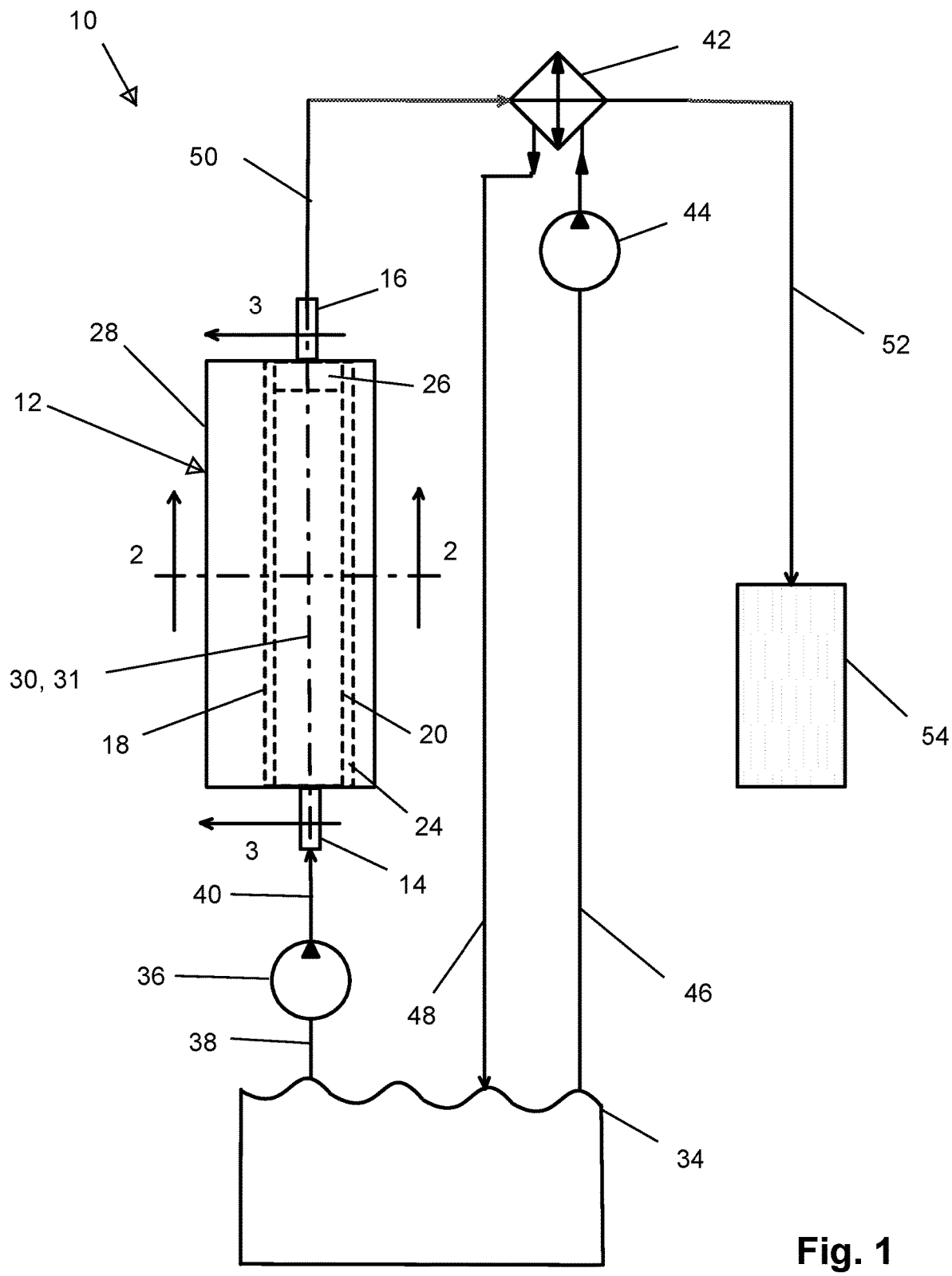
FIG. 1 is schematic diagram of a solar desalinator with a solar collector in accordance with the present invention.

Turning to FIG. 1, FIG. 1 illustrates a solar desalinator 10 that converts contaminated water, such as seawater, from a contaminated water source 34 to potable water in a potable water vessel 54. The solar desalinator 10 includes a trough-shaped parabolic mirror 28, a cylindrical solar collector 12 within the parabolic mirror, and a condenser 42. A contaminated water pump 36 draws contaminated water from the contaminated water source 34 through a contaminated water intake 38. The contaminated water pump 36 pumps the contaminated water through a contaminated water supply line 40 to a collector inlet 14 of the solar collector 12. In the solar collector 12, the contaminated water is converted to steam by solar energy reflected into the solar collector 12 from the parabolic mirror 28. The steam generated in the solar collector 12 is connected via a solar collector outlet 16 and a steam line 50 to the condenser 42 that converts the steam to potable water. A condenser pump 44 draws cooling water from the contaminated water source 34 through cooling water intake 46 and delivers the cooling water to the condenser 42 in order to convert the steam from the solar collector 12 to potable water. The cooling water is then returned to the contaminated water source 34 via cooling water return 48. The potable water produced by the condenser 42 is then delivered to a potable water vessel 54 via potable water line 52. Some of the steam can be siphoned off from the steam line 50 to drive a turbine (not shown) to produce electricity to drive the contaminated water pump 36 and the condenser pump 44.

The trough-shaped parabolic mirror 28 is configured in the shape of a trough and extends around the solar collector 12. The trough-shaped parabolic mirror 28 is offset from the outer shell 18, extends along the length of the solar collector 12, and is parallel to the inner conduit 20 and the outer shell 18. The focal line 31 of the trough-shaped parabolic mirror 28 coincides with the center line 30 of the inner conduit 20. In one example, the shape of the parabolic mirror 28 is defined by the equation: $f(x)=x^2/10$ with the focal line position at (0, 2.5).

As illustrated in FIGS. 2-7, the solar collector 12 comprises a cylindrical inner conduit 20 with a center line 30. Contaminated water enters the inner conduit 20 through collector inlet 14 at its lower end and steam exits the inner conduit 20 through collector outlet 16 at its upper end. An outer shell 18 surrounds the inner conduit 20 defining an annular vacuum space 24 between the inner conduit 20 and the outer shell 18. The inner conduit 20 and the outer shell 18 are formed of a borosilicate glass. The borosilicate glass has both high transparency and high resistance to temperature swings. The degree of vacuum in the annular vacuum space 24 is a contributing factor to the efficiency of the solar collector 12 and therefore desalinator 10. The vacuum within the annular vacuum space 24 is generally between 80% and 95%.

A disc-shaped silicone stopper 26 is positioned adjacent the collector outlet 16 at the top of the inner conduit 20. The silicone stopper 26 is capable of blocking water from exiting the inner conduit 20 through the collector outlet 16 while allowing steam to pass from the inner conduit 20 through the collector outlet 16. The silicone stopper 26 does not need to be pure but should maintain a relatively high quality (above 90% pure) to ensure the steam can pass through. The silicone stopper 26 should not be porous but instead should be solid. The silicone stopper 26 may increase the pressure above the contaminated water in the inner conduit 20. This increase in pressure results in a higher boiling point for the contaminated water. Such a higher boiling point will slightly increase the initial "heating up" time for the solar collector 12 before the contaminated water in the inner conduit 20 starts boiling and changing phase. When the contaminated water reaches its boiling point, however, the same amount of contaminated water will evaporate in the inner conduit 20 with the silicone stopper 26 in place versus a solar collector without a silicone stopper. That result occurs despite the higher boiling temperature because the overall energy absorbed by the solar collector 12 does not change with the silicone stopper 26 in place.

Figure 5:
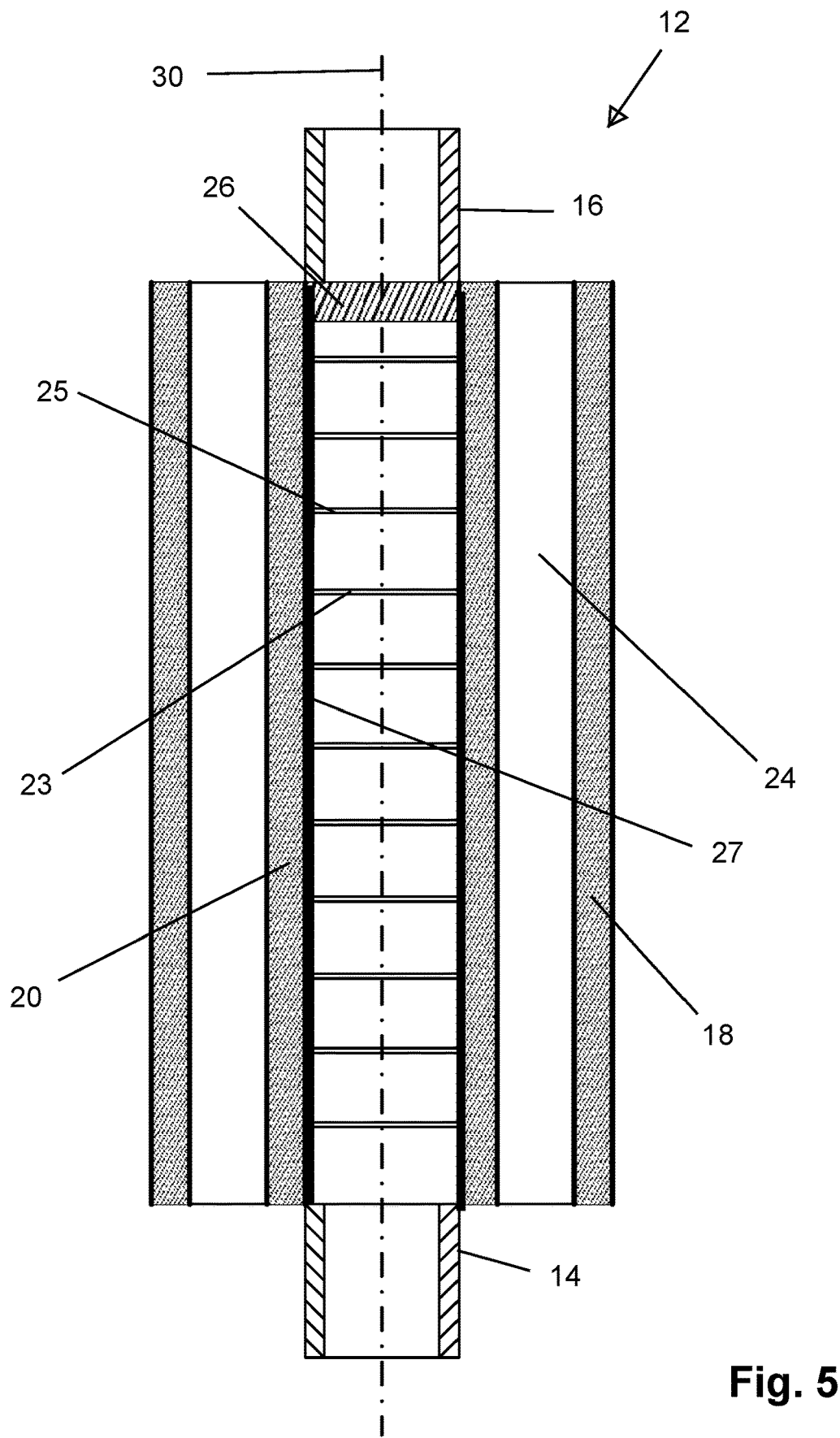
FIG. 5 is a section view of the second embodiment of the solar collector as viewed along line 3-3 of FIG. 1 with heat absorbing material in the form of the metal ladder structure in accordance with the present invention.

Energy absorbing materials 21 (FIG. 3), 22 (FIGS. 7), and 23 (FIG. 5) are positioned inside of the inner conduit 20. The energy absorbing materials 21, 22, and 23 function as media between the Sun's rays 32 reflected by the parabolic mirror 28 and the contaminated water in the inner conduit 20. When the Sun's rays 32 hit the energy absorbing materials 21, 22, and 23, the light energy in the Sun's rays 32 converts to thermal energy and is transferred to the contaminated water. The energy absorbing material 21 is in the form of metal coils (FIG. 3), the energy absorbing material 22 is in the form of a metal mesh (FIG. 7), and the energy absorbing material 23 is in the form of a ladder structure (FIG. 5).

When the reflected rays of the Sun hit the solar collector 12, both the energy absorbing materials 21, 22, and 23 and the contaminated water rise in temperature until the contaminated water reaches its boiling temperature. The contaminated water, however, does not evaporate just by reaching its boiling temperature. Instead, the contaminated water needs to absorb even more energy to achieve a phase change into steam. During the time between reaching boiling temperature and evaporating, the contaminated water continues to absorb energy but does not get any hotter, resulting in an overall decrease in the temperature of the contaminated water.

In a standard tube with a black outer coating used in conventional solar panels, the loss of heat during the phase change comes from the cooler water in the center of the standard tube. In the solar collector 12 of the present invention, however, the required phase change energy will not take energy from the surrounding water but instead from the heat stored in the mass of the energy absorbing materials 21, 22, and 23. Consequently, the contaminated water does not lose temperature as evaporation occurs unlike in a standard solar tube. In a sense, the energy absorbing materials 21, 22, and 23 act as thermal energy batteries to the solar collector 12, storing thermal energy in their mass as they supply heat to the contaminated water while continuing to absorb solar energy. The energy absorbing materials 21, 22, and 23 also heat the contaminated water from the inside out, leading to a better distribution of heat inside the inner conduit 20 and higher efficiency as a direct result.

Figure 2:
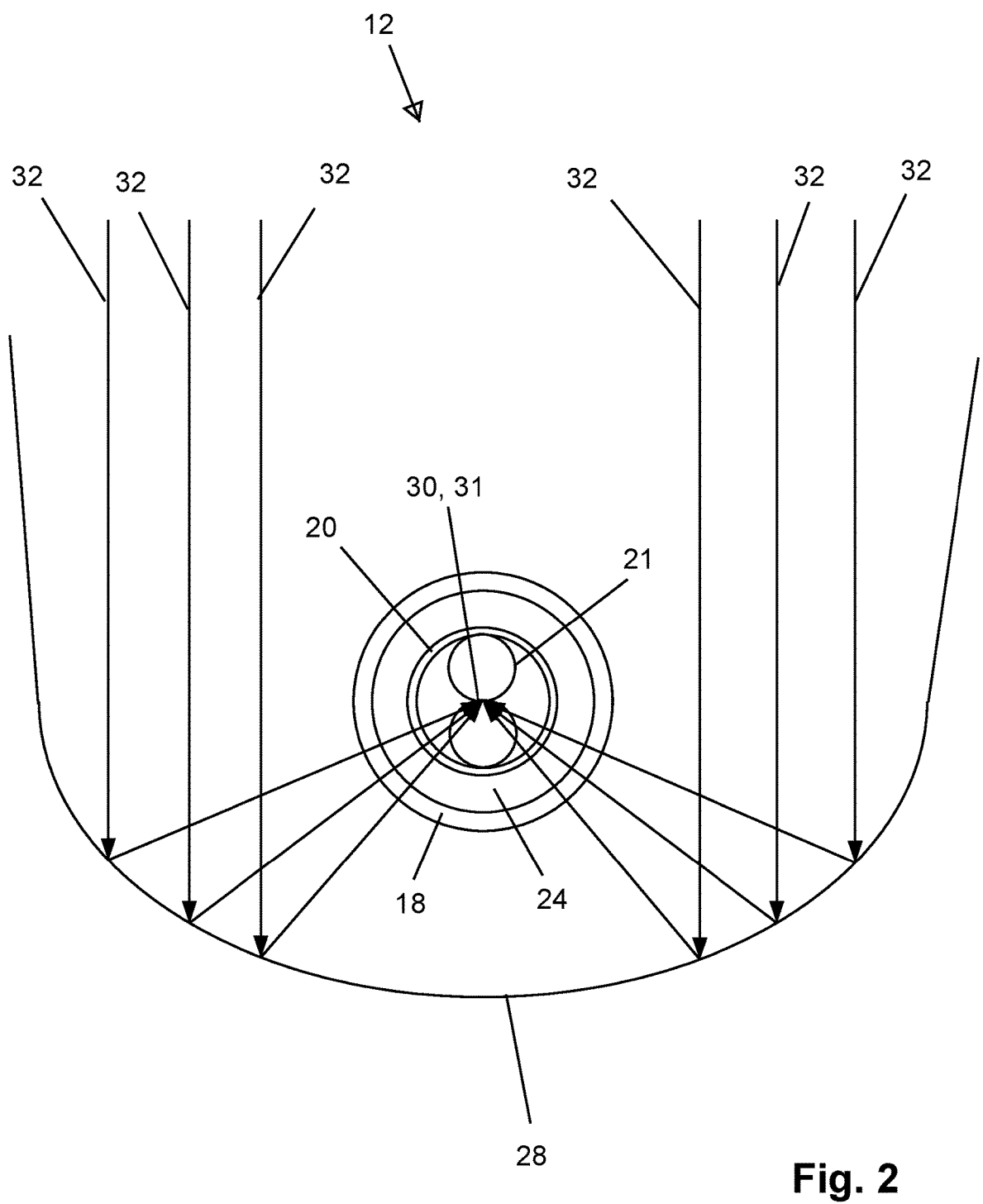
FIG. 2 is a section view of a first embodiment of the solar collector as viewed along line 2-2 of FIG. 1 with heat absorbing material in the form of a metal coils in accordance with the present invention.
Figure 3:
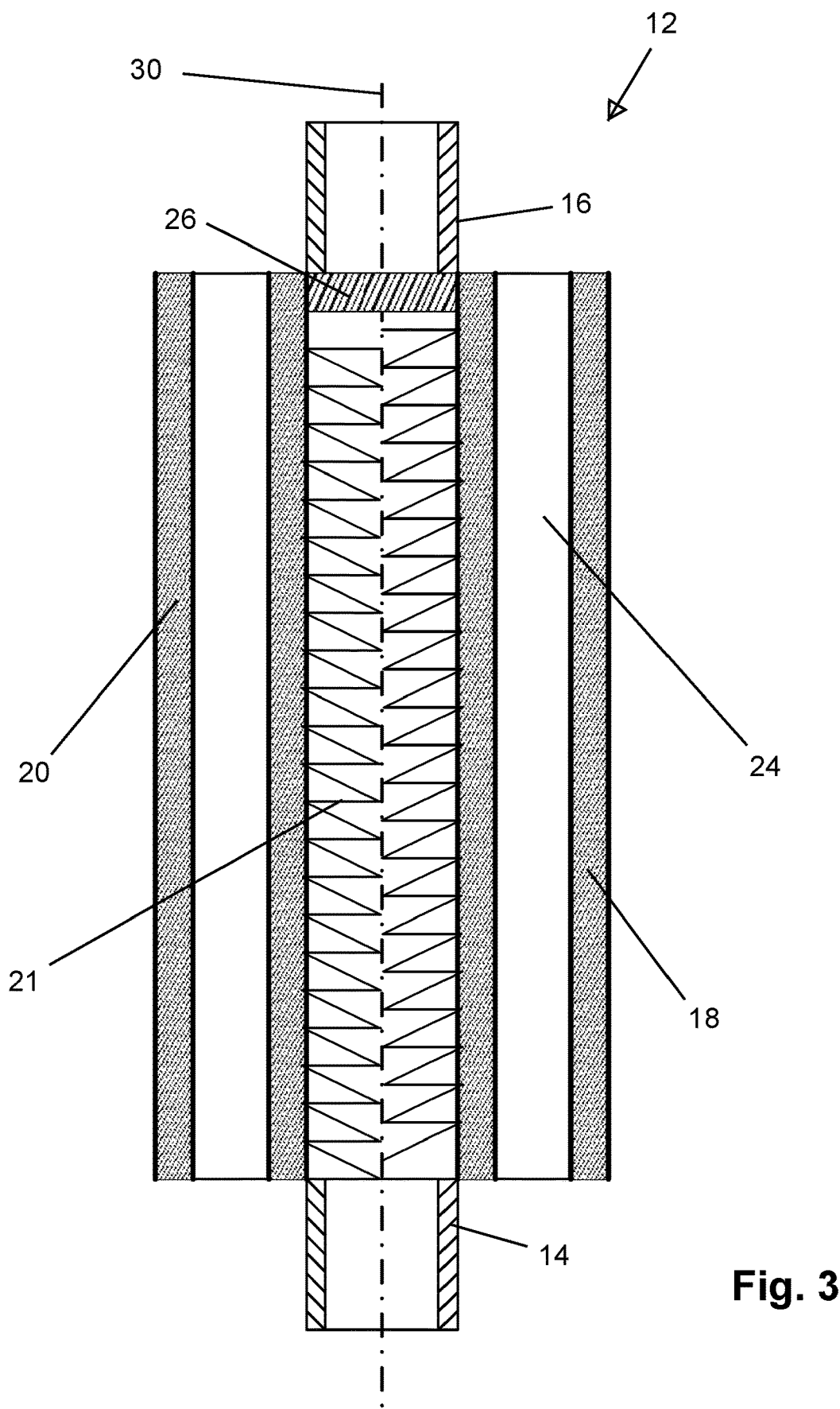
FIG. 3 is a section view of the first embodiment of the solar collector as viewed along line 3-3 of FIG. 1 with heat absorbing material in the form of the metal coils in accordance with the present invention.

With reference to FIGS. 2 and 3, the metal coils 21 are preferably copper coils. The size and weight, and distribution of the coils depend on the size of the inner conduit 20 and the cross-sectional diameter of the coils 21. Preferably the cross-sectional diameter of the coils 21 should be very thin, generally less than two centimeters. This thinness allows a bigger mass of coils 21 to fit into the inner conduit 20 while also providing a large contact surface between the coils 21 and the contaminated water inside the inner conduit 20. The coils 21 in the solar collector 12 will extend the length of the inner conduit 20. Because the coils 21 are thin, the coils 21 can be compressed to fit a large number of coils 21 into the inner conduit 20. The mass of the coils 21 is best determined by considering the percent of the volume of the inner conduit 20 that the coils occupy. For example, if the inner conduit 20 holds 25 liters of contaminated water (6.6 gallons) and the coils 21 occupy a quarter of the volume of the inner conduit 20, the mass of the coils 21 is determined by multiplying the density of copper (8.86 g/cm$^3$) by the volume of the coils 21 (one quarter of 25 liters=6.25 liters=6250 cm$^3$) which gives a mass of 55.375 kg or 122 pounds of copper. If the copper coils 21 in this situation were made with 12 gauge copper wire (about 2.64 mm, 0.104 in in diameter), the length of the copper wire would be 1,132 m long, or 0.704 miles. If this wire were to be made into coils 21 with each coil 21 having a 5 mm diameter, the length of the coils 21 would be 380.5 m long. However, with the coils 21 being so small and thin, the coils 21 can be easily be folded over or compressed to fit into the inner conduit 20 where the coils 21 would take up exactly one fourth of the volume of the inner conduit 20. Preferably, however, the coils take up much less that 25% of the volume in the inner conduit 20. The actual volume of copper coils 21 is closer to 1% of the volume of the inner conduit 20.

Copper is the preferred material for the coils 21 in the inner conduit 20. Copper has excellent thermal conductivity, which is the ability to exchange heat by conduction. A high thermal conductivity is important for performance of the solar collector 12 because thermal conductivity determines the rate at which the heat absorbed by the coils 21 transfers to the contaminated water in the inner conduit 20. Some materials that have a higher thermal conductivity are not as cheap as copper (e.g., silver). Copper is also a dark metal, allowing it to absorb sunlight more efficiently. Black paints exist that have high thermal conductivity and can be used to coat the coils 21 to ensure the coils 21 absorb as much reflected sunlight as possible.

The coils 21 have two properties that contribute to the efficiency of the solar collector 12. First, the coils 21 heat the contaminated water uniformly from the inside out. As a result, the thermal energy is distributed evenly throughout the inner conduit 20. If the water is not heated evenly, the solar collector 12 will lose energy as higher temperature water and lower temperature water create currents in the inner conduit 20. Second, the coils 21 have high surface area and volume. A high surface area means more area of contact between the coils 21 and the contaminated water, allowing better heat transfer from the coils 21 to the contaminated water. A high volume means a high mass of copper resulting in more heat energy that can be stored in the copper coils 21 for transfer to the contaminated water.

Figure 4:
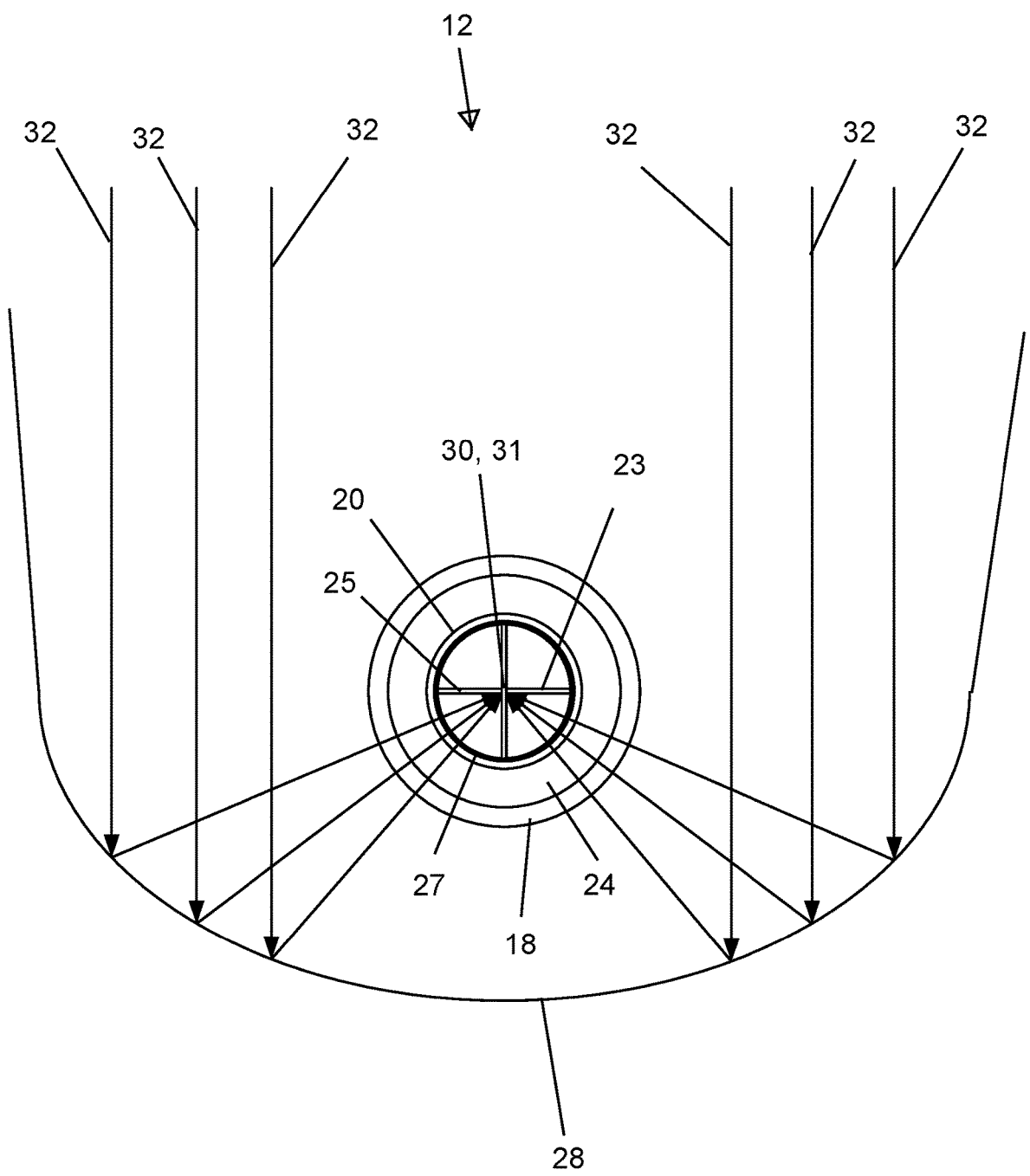
FIG. 4 is a section view of a second embodiment of the solar collector as viewed along line 2-2 of FIG. 1 with heat absorbing material in the form of a metal ladder structure in accordance with the present invention.

Any alternative configurations for the energy absorbing materials have to mimic those two properties of the coils 21. As shown in FIGS. 4 and 5, one possible alternative configuration for the energy absorbing material 23 includes a thin copper layer 27 on the inside wall of the inner conduit 20. In addition to the thin copper layer 27, an array of copper rods 25 span across the volume of the inner conduit 20 from one side of the copper layer 27 to the other, resembling a ladder on the inside of the inner conduit 20. The copper rods 25 can be oriented in a range of angles to the center line of the inner conduit 20 and can be spaced radially from each other. Further, the copper rods can be of any cross-section shape including without limit cylindrical, rectangular, triangular, elliptical, or square. Once the Sun's rays 32 are reflected onto the solar collector 12, the copper layer 27 will heat up. The heat in the copper layer 27 is transferred to the rods connected to the copper layer 27. This configuration both heats up the contaminated water from the interior and allows for a high surface area of copper, provided by the copper layer 27, to be in contact with the contaminated water. Other dark metals can be substituted for copper.

Figure 6:
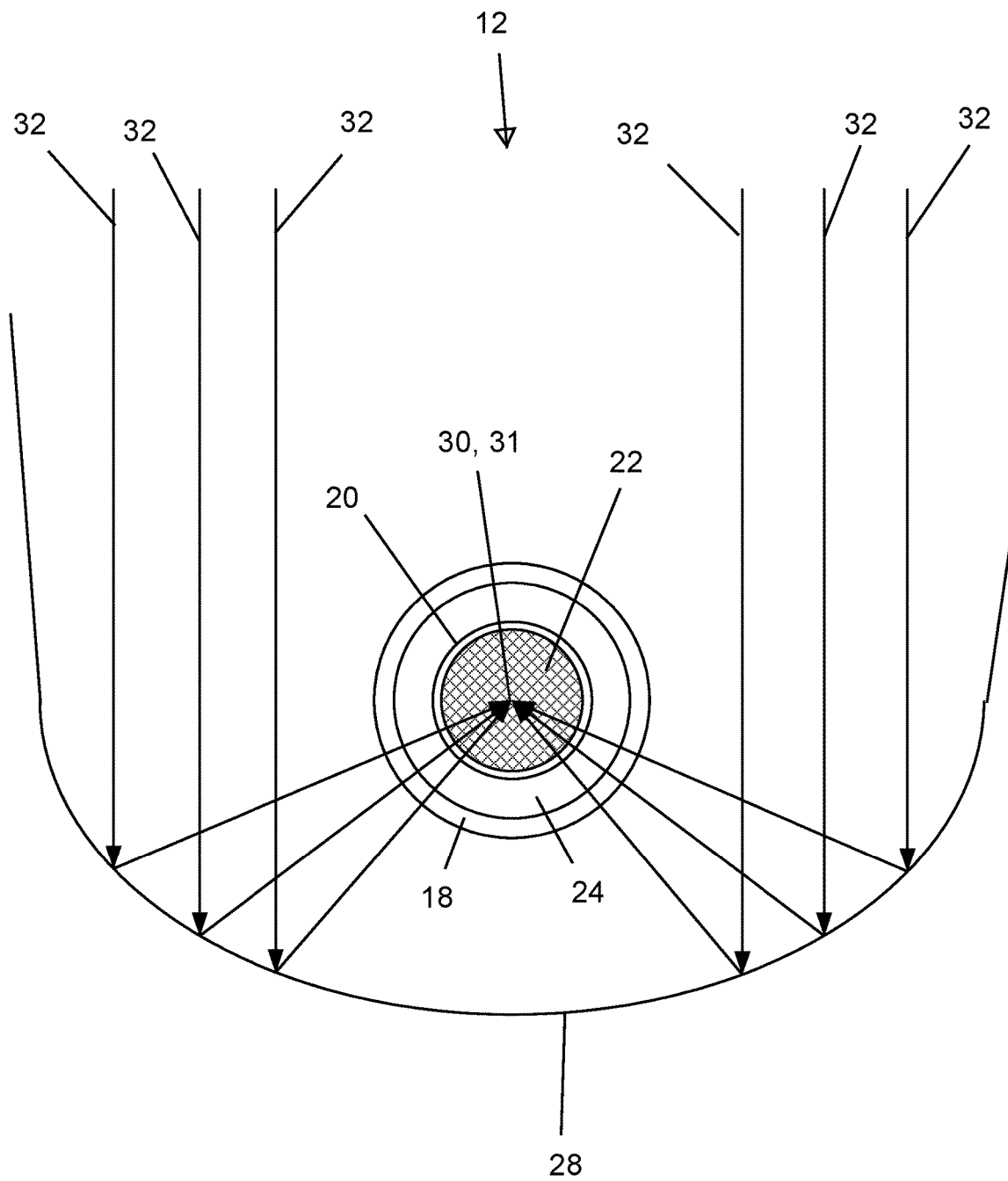
FIG. 6 is a section view of a third embodiment of the solar collector as viewed along line 2-2 of FIG. 1 with heat absorbing material in the form of a metal mesh in accordance with the present invention.
Figure 7:
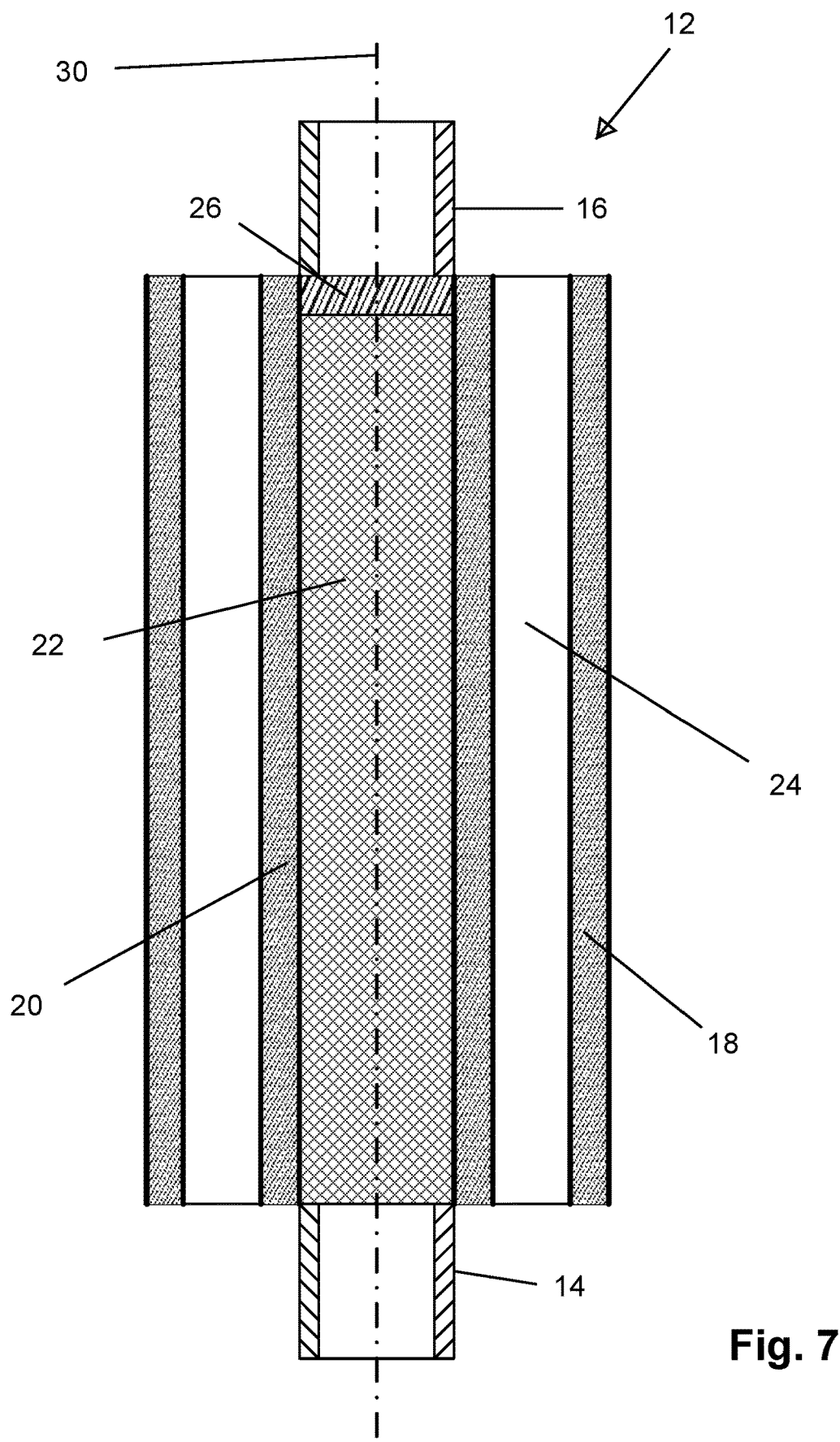
FIG. 7 is a section view of the third embodiment of the solar collector as viewed along line 3-3 of FIG. 1 with heat absorbing material in the form of the metal mesh in accordance with the present invention.

A further alternate configuration for the energy absorbing material 22 is shown in FIGS. 6 and 7. The energy absorbing material is a metal mesh 23. Preferably the metal mesh is a copper mesh. The copper mesh 23 may be a long copper sheet with holes punched in it and then rolled up to fit into the inner conduit 20. Alternatively, the copper mesh 23 may be formed by weaving copper wire into a thin sheet that is then rolled and inserted into the inner conduit 20. The amount of the copper mesh 23 is determined in the same way as previously described with respect to the copper coils, namely through a volume calculation.

Figure 8:
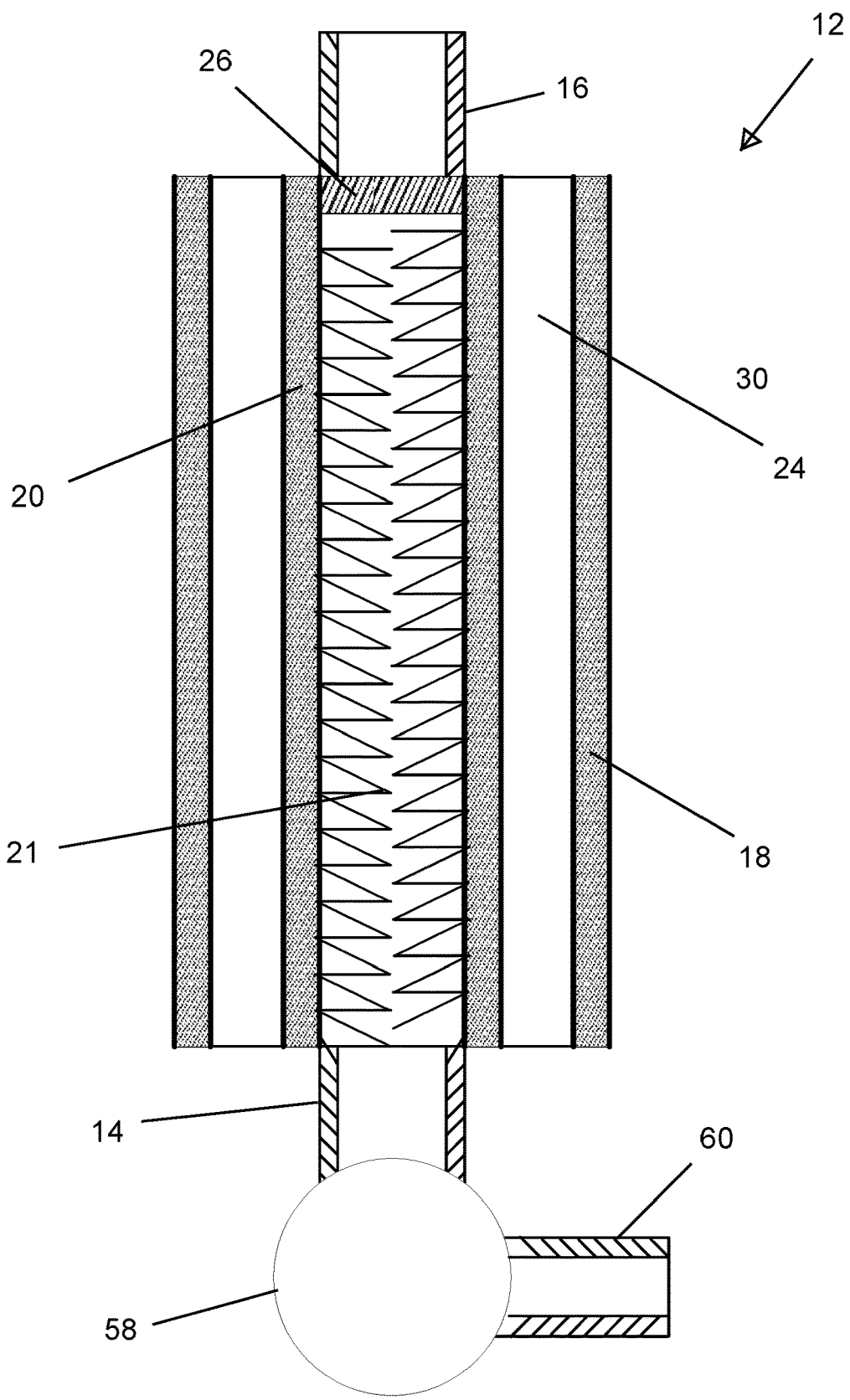
FIG. 8 is a section view, similar to FIG. 3, of the solar collector including a residue bulb in accordance with the present invention.

As a result of converting the contaminated water to steam in the inner conduit 20, residue, such as salt or other contaminants, are left behind in the inner conduit 20. In order to deal with such residue and as shown in FIG. 8, a residue bulb 58 is attached between the contaminated water inlet 60 and the collector inlet 14. Once the steam process begins in the inner conduit 20, the residue will sink to the bottom of the inner conduit 20 and into the bulb because the residue has a higher density than the surrounding contaminated water. After a predetermined period of operation, the residue bulb 58 can be removed, cleaned, and reinstalled.

EXAMPLE

The following is an example of one specific embodiment of the desalinator 10. The inner conduit 20 has a diameter of 0.1 meters and a length of 5 meters. The inner conduit 20 has a contaminated water volume of 0.157 m$^3$ or 157 liters. Without the copper coils 21, the inner conduit 20 holds 161 kg of saltwater.

The vacuum efficiency of the solar collector 12 is 85%.

The borosilicate glass forming the inner conduit 20 and the outer shell 18 has transparency of 92%.

The parabolic mirror 28 has a laminated Mylar surface. The Mylar surface has a reflectivity of 98%. The parabolic mirror 28 as a length of 5 m. The parabolic mirror 28 is formed along the middle of its length to fit a parabolic curve defined by $f(x)=x^2/8$. After being formed to the parabolic curve, the parabolic mirror 28 has a width of 7 m. In order to achieve a width of 7 m, the parabolic mirror 28 must have a width of 7.81 m before being formed to the specified parabolic curve. The reflective area of the parabolic mirror 28 (the area that the inner conduit 20 blocks)=5 m*7 m−0.1 m*5 m=34.5 m$^2$.

For the exemplary desalinator 10, the copper coils 21 constitute 0.5% of the volume in the inner conduit 20. The volume of the inner conduit 20 is 0.0393 m$^3$. Consequently, the copper coils 21 occupy 0.000196 m$^3$, or 0.196 liters of the inner conduit 20, thereby leaving saltwater to fill up the remaining 0.030907 m$^3$ of the inner conduit 20 and resulting in a mass of saltwater of 40.44 kg in the inner conduit 20. Copper has a density of 8940 kg/m$^3$, so the mass of the copper coils 21 is 1.755 kg. If the copper coils 21 are made of 12 gauge copper, the length of that copper wire would be 35.89 m long before being coiled. If each individual coil were 5 mm in diameter, the length of the coils is 12.1 m long. However, these copper coils 21 are thin enough to be folded and compressed to fit into the inner conduit 20 because the copper coils 21 occupy only 0.5% of the volume of the conduit 20. Consequently the mass of saltwater in the inner conduit 20 is 40.44 kg and the mass of copper coils 21 in the inner conduit 20 is 1.76 kg.

In order to determine the performance of the desalinator 10, the salinity of the saltwater is considered because the salinity of the saltwater affects the boiling point. The salinity of the water in the Atlantic Ocean off the western coast of Saharan Africa is 35 g/kg. Consequently, the boiling point of the saltwater is 101.1° C.

The sun's irradiance at Maydh, Somalia, is 2450 kwh/m$^2$/year. Consequently, the solar energy absorbed per day is irradiance/year*(1 year/365 days)*effective reflecting area*reflective efficiency*vacuum efficiency*3600 seconds/1 h=2450 kwh/m2*34.5 m2*0.98*0.85*(3600 s/h)/365=694,448.14 kilojoules per day. The energy needed to raise the temperature of the copper coils 21 to boiling point (101.1° C.) from room temp=specific heat of copper*change in temperature*mass=385 J/kg/° C.*81.1° C.*1.76 kg=54.88 kilojoules. The energy needed to raise 40.44 kg saltwater temp to boiling point=specific heat of saltwater*change in temperature*mass=3985 J/kg/° C.*81.1° C.*40.44 kg=13,069.54 kilojoules. The energy needed to complete phase change of 40.44 kg saltwater=mass*heat of vaporization of water=40.44 kg*2257000 J/kg=91,273.08 kilojoules The mass of saltwater that can be purified in one day of operation with this specific desalinator 10, is calculated taking the total solar energy per day, first subtracting the energy needed to raise copper to boiling point. 694,448 kj/d−55 kj/d=694,393 kj/d. This value gives the amount of energy used directly to purify the water in the inner conduit 20 per day. Second, add the energy needed to raise 40.44 kg saltwater temp to boiling point to the energy needed to complete phase change of 40.44 kg water, then divide that value by 40.44 kg. This value gives the energy needed to purify one kilogram of water. (13,069 kj+91,273 kj)/40.44 kg=2561 kj/kg. Finally divide the 253473351 kj/d by 2561 kj/kg to find the mass of water in kilograms purified in one day. 694,393 kj/d/2561 kj/kg=271.12 kilograms of clean water per day, 271.12 liters of clean water per day or 70.6 gallons per day.

At a salinity of 35 g/kg, this desalinator will produce about 9.49 kg of residue per day to be captured by the residue bulb 58.

This value of daily production of potable water is for this specific example of the desalinator 10 in a perfect day with no clouds. This production value also assumes that the parabolic mirror 28 is angled towards the sun for the entire day. The calculation does not take into account some minor factors that are present during production, such as increased pressure in the inner conduit 20 at higher temperatures and the gradual increase of salinity of the water as the desalinator 10 runs. These factors, however, would only raise the boiling point of the saltwater and should not result in a discrepancy of more than one or two gallons.

While this invention has been described with reference to preferred embodiments thereof, it is to be understood that variations and modifications can be affected within the spirit and scope of the invention as described herein and as described in the appended claims.

I claim:

1. A solar desalinator for removing contaminants from contaminated water to produce potable water comprising:
    a. a source of contaminated water;
    b. a solar collector for receiving the contaminated water comprising:
        i. an inner conduit having in internal wall defining a volume, a center line, a collector inlet for receiving the contaminated water, and a collector outlet for delivering steam;
        ii. an outer shell surrounding the inner conduit defining an annular vacuum space between the inner conduit and the outer shell;
        iii. a silicone stopper positioned adjacent the collector outlet capable of blocking water from the collector outlet but transmitting steam to the collector outlet; and
        iv. a heat absorbing material positioned within the inner conduit;
    c. a parabolic mirror configured as a trough, extending parallel to the solar collector, and having a focal line coincident with the center line of the inner conduit; and
    d. a condenser for receiving the steam from the collector outlet of the inner conduit and condensing the steam into potable water.

2. The solar desalinator of claim 1, wherein the heat absorbing material is a dark metal.

3. The solar desalinator of claim 2, wherein the heat absorbing material is in the form of coils.

4. The solar desalinator of claim 3, wherein the heat absorbing material is in the form of copper coils.

5. The solar desalinator of claim 2, wherein the heat absorbing material is in the form of a metal mesh.

6. The solar desalinator of claim 5, wherein the heat absorbing material is in the form of copper mesh.

7. The solar desalinator of claim 2, wherein the heat absorbing material is in the form of a layer of dark metal on the internal wall of the inner conduit and rods of dark metal extending from the layer of dark metal into the inner conduit.

8. The solar desalinator of claim 7, wherein the layer of dark metal is in the form a layer of copper on the internal wall of the inner conduit and the rods of dark metal are rods of copper extending from the layer of copper into the inner conduit.

9. The solar desalinator of claim 1, wherein a residue bulb is attached between the collector inlet and the source of contaminated water for receiving residue left by evaporation of contaminated water in the inner conduit.

\* \* \* \* \*